Jan. 18, 1966  J. E. WALDRUM  3,229,912
AERIAL SPRAY DEVICE

Filed Dec. 17, 1963  2 Sheets-Sheet 1

INVENTOR.
JOHN E. WALDRUM
BY
Caesar and Rivise
ATTORNEYS.

Jan. 18, 1966   J. E. WALDRUM   3,229,912
AERIAL SPRAY DEVICE
Filed Dec. 17, 1963   2 Sheets-Sheet 2
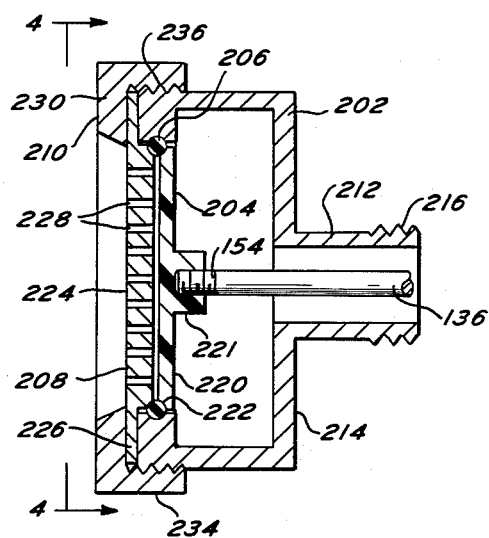
FIG. 3
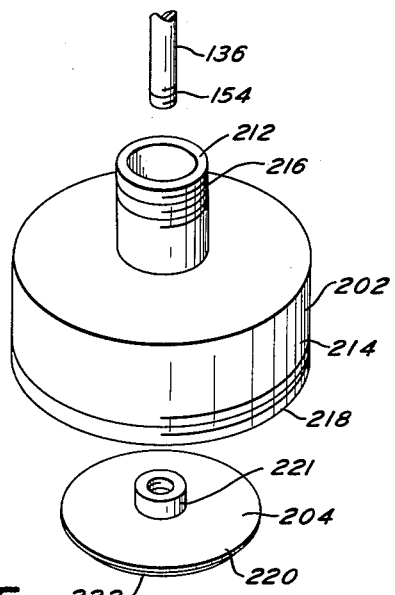
FIG. 5
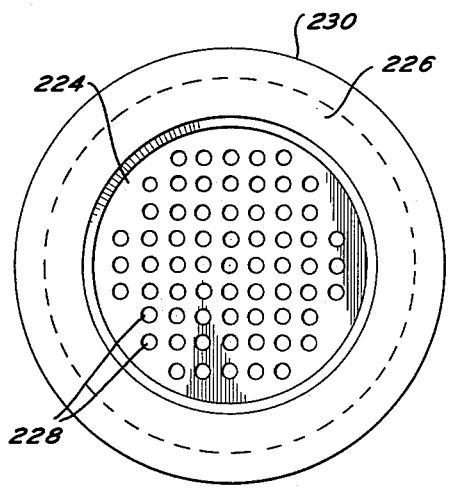
FIG. 4
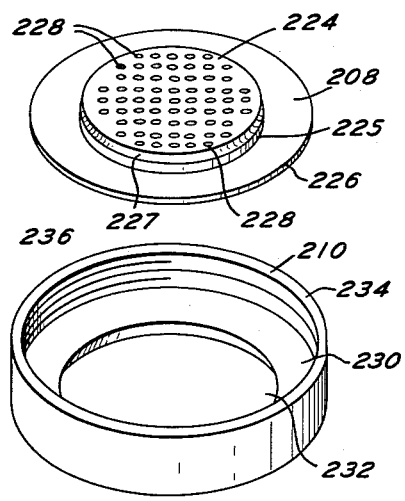
INVENTOR.
JOHN E. WALDRUM
BY
Caesar and Rivise
ATTORNEYS.

United States Patent Office 3,229,912
Patented Jan. 18, 1966

3,229,912
AERIAL SPRAY DEVICE
John E. Waldrum, Ambler, Pa., assignor to Amchem Products, Inc., Ambler, Pa., a corporation of Delaware
Filed Dec. 17, 1963, Ser. No. 331,186
8 Claims. (Cl. 239—225)

This invention relates to a novel aerial spray device and particularly relates to a spray device of the rotary type adapted to be used on an aircraft during flight.

This invention is an improvement over the aerial spray device disclosed and claimed in the applicant's Patent No. 2,917,242.

The use of aerial spraying for the control of weeds and other undesirable vegetation in large areas is becoming of increasing importance. The aircraft used for spraying may be either of the fixed or rotary wing type but, in either case, a much larger area can be effectively covered in this manner than would otherwise be possible. Nevertheless, certain problems have presented themselves in connection with such aerial spraying which have greatly inhibited its total effectiveness. Among such problems are adequate control of the spray patterns, especially for varying altitudes of the aircraft, adequate control of the spray system to prevent accidental discharge of the spray, adequate control of the system to immediately cut off the spray if there should be an accidental discharge, and adequate control of the system to eliminate the effects of centrifugal force on opening and closing of the spray nozzles.

The foregoing problems as well as other were effectively solved by the aerial spray device of the applicant's Patent No. 2,917,242. The device of said patent comprised basically a rotatable tube and a hollow spray head at one end of the tube. Means operatively connected the tube to a source of sprayable material, and means were operatively connected to the tube for rotating the tube. An axially movable control shaft extended through the tube into the spray head. Means operatively connected the control shaft to a linkage assembly within the spray head in order to adjust the operating position of the linkage assembly. A nozzle extended from the spray head, and a valve mechanism in the spray head was operatively connected to the nozzle in order to open and close the nozzle, with means being provided to operatively connect the linkage assembly to the valve mechanism.

In the construction of said Patent No. 2,917,242 the material was sprayed as permitted by the unseating of a valve head from a valve seat. The valve seat extended outwardly into an elongated nozzle through which the sprayable material passed after flow was permitted by the unseating of the valve head. From the elongated nozzle the sprayable material was discharged into the atmosphere by the centrifugal force of rotation of the entire assembly.

The aforesaid aerial spray device of said Patent No. 2,917,242 has achieved its intended objectives and has proved to be generally satisfactory. However, in using the device of said Patent No. 2,917,242 it was discovered that whenever discharge of the sprayable material was halted that a considerable amount of the sprayable material was retained outwardly of the valve head in the elongated nozzle. This resulted in a discharge in the nature of "dripping" of the sprayable material contained in the elongated nozzle after the valve head had been seated and spraying presumably halted.

The aforesaid discharge subsequent to the shutting of the valve head has proved to be very serious when the material being sprayed is a systemic herbicide such as 2,4-dichlorophenoxyacetic acid. It is well known that only a few drops of a systemic herbicide are needed in order to kill a plant. Hence, it was found that when spraying of a systemic herbicide was halted as when the aircraft reached the boundaries of the area being sprayed that continued discharge of the systemic herbicide contained in the elongated nozzle resulted in spraying of adjacent property. Where the adjacent property contained tomato crops or cotton crops or other economic crops that are attacked by systemic herbicides the damage was quite serious and costly.

It was accordingly suggested that the elongated nozzle be eliminated. However, an effective spray pattern had been obtained through the use of the elongated nozzle, and it was with this objective in mind that the applicant conceived the present invention.

It is therefore an object of the present invention to provide an aerial spray device which when turned off almost instantaneously halts the discharge of material therefrom.

Yet another object of the present invention is to provide a novel aerial spray device which eliminates residual hold-up of herbicidal spray.

Still another object of the present invention is to provide a novel aerial spray device which is "drip-proof."

Other objects and many of the attendant advantages of this invention will be readily appreciated as the same becomes better understood by reference to the following detailed description when considered in connection with the accompanying drawings wherein:

FIG. 3 is a view similar to FIG. 2 showing the valve body and portions of the assembly associated therewith, with the valve disc being in the closed position;

FIG. 4 is an elevational view taken along the lines 4—4 of FIG. 3; and

FIG. 5 is an exploded perspective view of the valve body assembly of FIG. 3.

Figure 1:
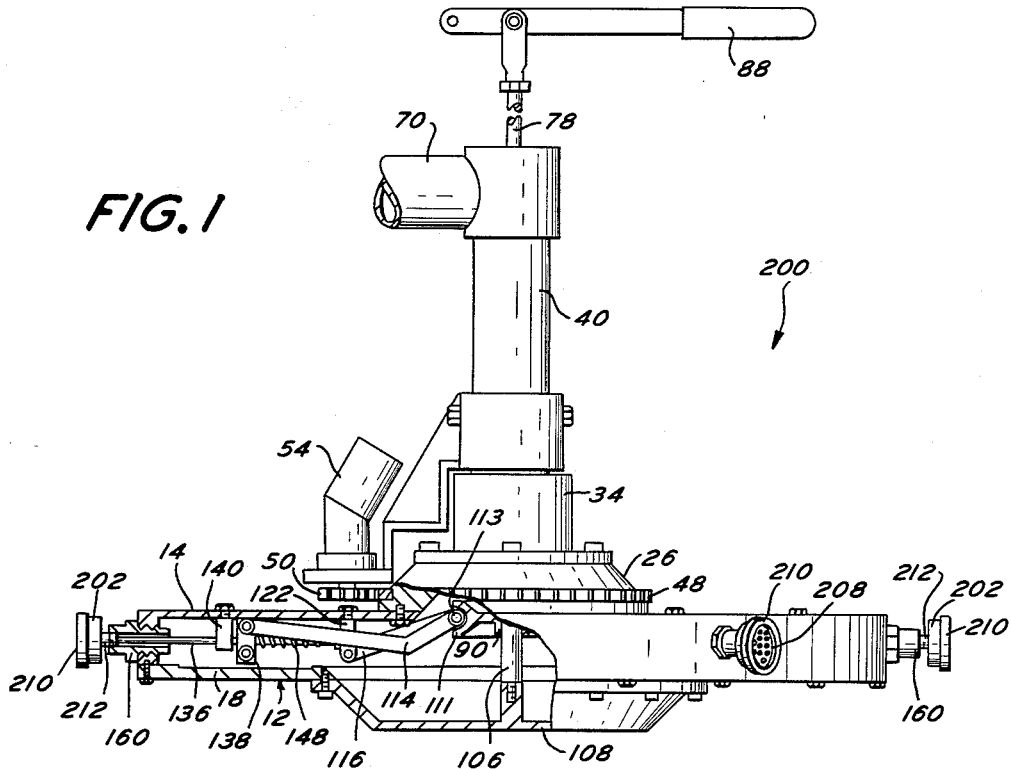
FIG. 1 is a side view, partly in section and partly in elevation of a spray device embodying the present invention, the nozzles being shown in the closed position.

Referring now in greater detail to the drawings wherein similar reference characters refer to similar parts, there is shown in FIG. 1 a spray device 200 embodying the present invention. For ease of reference, to the extent possible, the reference characters employed in said Patent No. 2,917,242 will be employed herein, and to the extent possible, the disclosure of said Patent No. 2,917,242 is incorporated herein.

The basic parts of the present aerial spray device are illustrated in FIG. 1 wherein the present spray device is shown to comprise a hollow disc-like head 12 consisting of a top plate 14 and a bottom plate 18. The upper and lower plates 14 and 18 are each centrally apertured with the central aperture in the upper plate 14 being encompassed by an upstanding, inwardly and upwardly papered boss 26. A vertical sleeve 34 is provided, having a flange which is connected to the upper end of the boss 26. A stationary tube 40 leads upwardly from the vertical sleeve 34 to a lateral conduit 70 that connects to a source of fluid pressure (not shown).

Positioned on the lower external surface of boss 26 is an annular gear 48 which is in mesh with a drive pinion 50. The pinion 50 has a shaft which is connected to the motor shaft of electric motor 54.

Extending into the tube 40 is a control shaft 78, the upper end of which is secured to and motivated by turning of a lever 88 that is accessible to the pilot or spray operator.

The lower end of shaft 78 extends down through the tube 40 to a position wherein it is connected by a universal pivot to a sleeve 90, the lower end of which is telescopically positioned on a post 106 extending upwardly from a recessed plate 108 that covers the enlarged central aperture in the plate 18.

The collar 111 is secured adjacent the lower end of the sleeve 90 and possesses a peripheral groove which loosely receives a plurality of annularly spaced pivot pins 113. Each of the pivot pins 113 pivotally connect the ends of a pair of spaced, parallel links 114 to a lever 116 positioned therebetween. The outer end of the lever 116 is pivotally connected to a bracket 122 which includes a channel in which is slidably positioned the reduced end of a rod 136. The rod 136 extends through and is connected to a movable bracket 138 and also extends through a fixed guide 140. A coil spring 148 surrounds rod 136 between a pair of slidable collars.

Up to this point the present invention has been essentially the same as that disclosed and claimed in Patent No. 2,917,242.

However, because of the problems encountered in connection with elongated nozzles and particularly the desire to make a "drip-proof" spraying device, the spraying apparatus of said Patent No. 2,917,242 has been inventively modified.

Towards this end a threaded coupling 160 has been provided which has external threads 161 adjacent its inner end and internal threads 163 adjacent its outer end.

In the device of said Patent No. 2,917,242, a valve head was threaded upon the threads 154 of the outer end of the rod 136. Such a valve head was adapted to be moved inwardly of a valve seat in order to permit the discharge of the sprayable material by virtue of the centrifugal force of rotation opposed upon the plates 14 and 18.

In the present invention, however, the rod 136 is extended through the entire coupling 160 and outwardly therefrom as will be discussed hereinafter.

Figure 2:
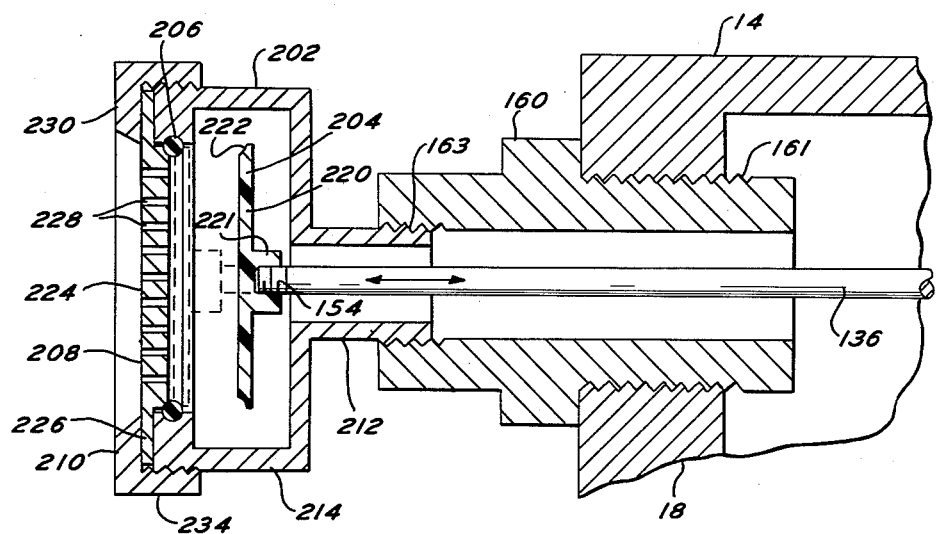
FIG. 2 is an enlarged fragmentary sectional view illustrating the improved structure of the present invention and wherein the valve disc is in the open position, with the closed position thereof being shown in phantom.

As shown in FIG. 2 the coupling 160 is secured to the plates 14 and 18 by means of the threads 161 of the coupling 160 being in engagement with complementary threads on the plates 14 and 18.

In the device of said Patent No. 2,917,242 an elongated nozzle was secured to the internal threads of the coupling 160. However, in the present device a valve 202 is secured to the coupling 160 by engagement with the internal threads 163.

The components of the improved structure of the present invention are shown in detail in FIG. 5 wherein the valve body 202 is adapted to receive a valve disc 204. An O-ring seat 206 is provided in order that the valve disc 204 may be tightly seated against perforated disc 208 when the valve disc 204 is in the closed position. A disc retainer 210 is employed to close the valve body 202 and also hold the perforated disc 208.

As further shown in FIG. 5, the valve body 202 may be of plastic and essentially comprises a connecting section 212 of relatively small diameter and a housing section 214 of relatively wide diameter. The connecting section 212 includes external threads 216 which engage the internal threads 163 of the coupling 160. The housing section 214 includes external thread 218 for retention of the disc retainer 210.

The valve disc 204 may be of plastic and is essentially a flat plate 220, with threaded socket 221 and having a bevelled edge 222 which is adapted to engage the O-ring seat 206 when the valve disc is brought to the closed position of FIG. 3. The threaded end 154 of rod 136 is secured within socket 221.

The perforated disc 208 may be of plastic and is essentially comprised of a central spray section 224 which is of a somewhat greater thickness than a peripheral skirt 226 by virtue of rim 225 and edge 227. The spray section 208 includes openings 228 which may be formed on a 22½° angle with respect to the plane of spray section 224 or may lie perpendicular thereto or in any other desired angle.

The disc retainer 210 may be of plastic and is in the nature of a cap and includs an outer surface 230 having an enlarged opening 232. A thin, cylindrical wall 234 depends from the outer surface 210 and has internal threads 236 formed therein which engage the external threads 218 of the valve body 202.

The opening and closing of the combined nozzle-valve assembly of the present invention is illustrated by comparing FIGS. 2 and 3. When the rod 136 is pulled inwardly by virtue of the downward movement of the shaft 78, the flat plate 220 of the valve disc 204 is also pulled inwardly away from sealing engagement with the O-ring seat as shown by comparing the phantom and full-line position of FIG. 2. The valve disc may be returned to the closed position by the upward movement of the shaft 78 with the closed position being shown in FIG. 3.

In the overall operation of the present apparatus, the fluid spraying composition is passed from the source in the aircraft (not shown) down through the conduit 70 and then through tube 40 in the head 12. The spraying fluid may be either gravity or force fed through this path, and may be controlled at its source by any ordinary control means, such as a solenoid valve, operated by the pilot or operator of the spray mechanism.

When a spray operation is begun the pilot or spray operator actuates the motor 54 to rotate the head 12 through gearing 48 and 50. The operator then pushes the shaft 78 down to cause downward motion of sleeve 90 and collar 111. The downward movement of collar 111 moves pivot pin 113 down to change the position of linkage 114–116. As this is done, the rod 136 is pulled inwardly to unseat the valve disc 204, and thus the valve is open.

The valve is furthermore held in such open position by virtue of the action of the spring 148 even under the counteraction of centrifugal force due to the change of position of the linkage whereby the moment of force about the pivotal interconnection of lever 116 and bracket 122 is changed. In this position the radially outward force of both the spring 148 and the centrifugal force is changed by the position of the liquid to a force exerted in the opposite direction. Consequently, the tendency of the valve to remain open is actually increased by the action of the spring and of centrifugal force.

When it is desired to shut off the spray, the shaft 78 is moved upwardly, and this causes the collar 111 to lift the pivot 113, and thereby causes links 114 to move bracket 138 outwardly. Accordingly, the valve disc 204 is also moved outwardly and seated in the closed position against the O-ring seat 206. In this position the spring as well as centrifugal force act to hold the valve disc on its seat.

It is thus seen that the present invention effectively eliminates the elongated tube of the device of Patent No. 2,917,242, and at the same time retains an effective spray pattern. The present device is "drip-proof" with but a thin film of liquid on disc 208 and a very minute amount of material in the openings being the only material externally of the valve disc 204 when it is brought to the closed position.

Obviously many modifications and variations of the present invention are possible in the light of the above teachings. It is, therefore, to be understood that within the scope of the appended claims, the invention may be practiced otherwise than as specifically described.

What is claimed as the invention is:

1. In a spraying device comprising a rotatable tube, means operatively connecting said tube to a source of sprayable material, means operatively connected to said tube for rotating said tube, a hollow spray head at one end of said tube, an axially movable control shaft extending through said tube into said spray head, means operatively connecting said shaft to a linkage assembly within said spray head for adjusting the operating position of said linkage assembly, said last-named means including rod means, the improvement comprising said rod means extending through and beyond said spray head and valve disc means associated therewith beyond said spray head, a valve body means beyond said spray head, said valve body means having an open end and said valve disc means being adapted to be seated in closing engagement with said open end against said valve body means, and a perforated disc being secured within said open end whereby when said valve disc is seated against said valve body means, there is substantial instantaneous halting of the discharge of material therefrom.

2. The invention of claim 1 wherein there are a plurality of valve bodies, each containing a valve disc and a perforated disc, each of said valve bodies extending radially from the outer periphery of said spray head and each being operatively connected to an individual linkage assembly, each of said valve bodies being spaced from each other circumferentially of said spray head and said linkage assemblies all being operatively connected to said control shaft.

3. The invention of claim 1 wherein said valve body means has an O-ring seat associated with the open end thereof whereby said valve disc means will be tightly seated in closing engagement with said open end.

4. The spraying device of claim 1 wherein said means for rotating said tube comprises an annular gear connected to said tube and in mesh with a pinion on the motor shaft of a variable speed motor, said motor being operatively connected to a means for varying its speed.

5. In a spraying device comprising a spray head rotatably connected to a support, said support being adapted to be connected to an aircraft, said spray head being hollow and in fluid connection with a source of sprayable material, the improvement comprising at least one valve body means extending radially from the periphery of said spray head, means in said spray head including rod means extending through and beyond said spray head into said valve body means, a valve disc means secured to said rod means and being adapted to be seated against said valve body means, perforated disc means secured within said valve body means, and linkage means connecting said rod means to a control shaft movable axially of said spray head, said linkage means having a connecting pivot which is adjustable axially of said spray head by said control shaft.

6. The spraying device of claim 5 wherein said spray head is operatively connected to a variable speed motor for rotation thereby.

7. The spraying device of claim 5 wherein there are a plurality of valve bodies in annularly spaced relationship to each other on the periphery of said spray head, each valve body having an individual valve disc and perforated disc, the linkage of all said rod means of said valve bodies extending radially toward the axis of rotation of said spray head and being operatively connected to said common control shaft.

8. The invention of claim 5 wherein said valve body means has an O-ring seat associated with the opening thereof whereby said valve disc will be tightly seated against said valve body means.

References Cited by the Examiner
UNITED STATES PATENTS

| | | | |
|---|---|---|---|
| 391,475 | 10/1888 | Lacy | 239—583 |
| 1,832,724 | 11/1931 | Mueller | 239—562 |
| 2,207,139 | 7/1940 | Weightman | 222—571 X |
| 2,914,258 | 11/1959 | Ruetsch | 239—562 |
| 2,917,241 | 12/1959 | Waldrum | 239—222 |
| 2,917,242 | 12/1959 | Waldrum | 239—225 |

FOREIGN PATENTS 614,507   9/1926   France.

M. HENSON WOOD, Jr., *Primary Examiner.*

EVERETT W. KIRBY, *Examiner.*